United States Patent [19]
Ohnishi

[11] Patent Number: 5,572,676
[45] Date of Patent: Nov. 5, 1996

[54] NETWORK I/O DEVICE HAVING FIFO FOR SYNCHRONOUS AND ASYNCHRONOUS OPERATION

[75] Inventor: Kenji Ohnishi, Hyogo-ken, Japan

[73] Assignee: Mitsubishi Denki Kabushiki Kaisha, Japan

[21] Appl. No.: 296,994

[22] Filed: Aug. 26, 1994

Related U.S. Application Data

[63] Continuation of Ser. No. 865,015, Apr. 8, 1992, abandoned.

[30] Foreign Application Priority Data

Apr. 10, 1991 [JP] Japan .................................... 3-104856

[51] Int. Cl.⁶ .................................................. G06F 13/00
[52] U.S. Cl. ...................... 395/200.2; 395/250; 395/309; 395/310; 364/DIG. 1; 364/240.2; 364/240.7; 364/242.95; 364/244.5; 364/238.7; 364/270.5; 364/271
[58] Field of Search ................... 395/200.2, 250, 395/828, 834, 872, 309, 310, 375, 436, 800

[56] References Cited

U.S. PATENT DOCUMENTS

| | | |
|---|---|---|
| 3,699,525 | 10/1972 | Klavins .................................... 395/775 |
| 4,407,016 | 9/1983 | Bayliss et al. ........................... 395/823 |
| 4,587,651 | 5/1986 | Nelson et al. .......................... 370/85.12 |
| 4,635,194 | 1/1987 | Burger et al. ............................. 395/375 |
| 4,700,358 | 10/1987 | Duncanson et al. ..................... 375/222 |
| 4,722,049 | 1/1988 | Lahti ......................................... 395/375 |
| 4,742,454 | 5/1988 | Robinson et al. ....................... 395/250 |
| 4,788,038 | 11/1988 | Ogawa et al. ............................ 395/250 |
| 4,819,201 | 4/1989 | Thomas et al. .......................... 395/250 |
| 4,837,730 | 6/1989 | Cook et al. ............................... 395/800 |
| 4,933,935 | 6/1990 | Adams .................................... 370/85.7 |
| 4,949,333 | 8/1990 | Gulick et al. .............................. 370/32 |
| 5,043,938 | 8/1991 | Ebersole ............................... 395/200.2 |
| 5,101,489 | 3/1992 | Sato et al. ................................ 395/307 |
| 5,107,465 | 4/1992 | Fung et al. .......................... 365/230.08 |
| 5,132,678 | 7/1992 | Morris ..................................... 340/800 |
| 5,155,810 | 10/1992 | McMamara, Jr. et al. ............. 395/250 |
| 5,175,818 | 12/1992 | Kunimoto et al. ................... 395/200.2 |
| 5,255,239 | 10/1993 | Taborn et al. ........................... 365/221 |
| 5,404,452 | 4/1995 | Detschel et al. ........................ 395/250 |
| 5,412,782 | 5/1995 | Hausman et al. ....................... 395/250 |

Primary Examiner—Lance Leonard Barry
Attorney, Agent, or Firm—Townsend and Townsend and Crew

[57] ABSTRACT

A network input/output device incorporates a no. 1 data switching circuit and no. 2 data switching circuit for connecting a FIFO with a transmission register, a reception register, or both transmission and reception registers, according to values set in a mode register. The network I/O device allows a reduction in the pattern area of VLSIs of the I/O device, and the use of both clock synchronization and asynchronous configurations.

4 Claims, 8 Drawing Sheets 5,572,676

NETWORK I/O DEVICE HAVING FIFO FOR SYNCHRONOUS AND ASYNCHRONOUS OPERATION

This is a continuation of application Ser. No. 07/865,015, filed Apr. 8, 1992, now abandoned.

BACKGROUND OF THE INVENTION

The present invention relates to network input/output (I/O) devices, such as a serial input/output device.

A block diagram showing the structure of a conventional I/O device is shown in FIG. 3. The I/O device is comprised of transmission register 3, reception register 4, transmission first-in/first-out (FIFO) register 5a, reception FIFO 5b, and data bus 8. FIFOs 5a and 5b are first-in/first-out shift registers, and each data bus 8 is connected to a host computer not shown in FIG. 3. At present, when data are transmitted from the host computer through a network to the outside the host computer writes data to an assigned address within transmission FIFO 5a and the data are stored in a memory within FIFO 5a from data bus 8. If more data are written to the same address, the previously stored data are shifted to an output port, and data are successively stored. Data can thus be stored to the maximum limit allowed by the structure of FIFO 5a. When transmission register 3 is enabled for transmission, transmission FIFO 5a transfers data to transmission register 3 one byte at a time in the order of storage, and transmission register 3 serially outputs data 7a to network N. When transmission of one byte of data is completed, transmission FIFO 5a sends the next byte of data to transmission register 3. In the reception of data, reception register 4 receives data 7b from network N serially. When one byte of data is received, reception register 4 transfers the reception data to reception FIFO 5b, then begins receiving the next data. When the address assigned in reception FIFO 5b is read, reception FIFO 5b outputs the data to data bus 8 in order of storage, starting with the earliest data.

FIG. 4 shows plural serial I/Os connected to network N in a connection pattern for clock-synchronized operations, while FIG. 5 shows the operation. The serial output terminal 11a, serial input terminal 12a, and clock terminal 13a of serial I/O 10a are connected respectively through a network to serial input terminal 12b, serial output terminal 12a, and clock terminal 13b of serial I/O 10b. The transfer clock is generated by either serial I/O 10a or serial I/O 10b, with both using the same transfer clock. As shown in FIG. 5, transfer register 3 shifts and outputs data 7a to serial output terminal 11a with each fall of transfer clock $\emptyset$. On the reception side, reception register 4 shifts and latches data 7b from input terminal 12a with each rise of transfer clock $\emptyset$.

FIG. 6 shows plural serial I/Os connected to network N in a connection pattern for asynchronous universal asynchronous receiver/transmitter (UART) operations, while FIG. 7 shows the operation. The connection of serial input terminals 11a and 11b and serial output terminals 12a and 12b is the same as that for clock-synchronized operations, but without the connection of clock terminals 13a and 13b. Moreover, start bit, stop bit, parity bit, transfer speed, and other transmission specifications are the same for both serial I/O 10a and serial I/O 10b. Transmission register 3 shifts and outputs data 7 to serial output terminal 11a at the fall of internally generated transmission clock $\emptyset 1$. On the reception side, reception register 4 shifts and latches data 7b in synchronization with the receipt of start bit ST at the rise of internally generated clock $\emptyset 2$.

As described above, when the same transfer clock $\emptyset$ is used by transmission register 3 and reception register 4 in the clock-synchronized operations shown in FIG. 4, transmission and reception occur in synchronization. On the other hand, when transmission register 3 uses transmission clock $\emptyset 1$ and reception register 4 uses reception clock $\emptyset 2$ in the UART configuration shown in FIG. 6, transmission and reception occur asynchronously.

Due to the structure of a conventional I/O device as described above, the use of a UART configuration in which transmission and reception occur asynchronously results in the need for transmission register 3 and reception register 4 to incorporate transmission FIFO 5a and reception FIFO 5b, respectively. In the construction of a system, reception data are read and used with high frequency each time one byte of data is received on the reception side, resulting in the inefficient use of the reception FIFO. When clock synchronization is used, transmission data are written to the transmission FIFO, and reception data are read from the reception FIFO. FIG. 8 is block diagram for another serial I/O using clock synchronization, in which transmission data are written to FIFO 5 and transferred to transfer register 3 in one-byte units at the start of transmission. At this time, the empty space created in FIFO 5 by the transfer and reading of the first byte is used to store data received from the network by reception register 4. However, since the asynchronous serial I/O configuration of FIG. 4 uses two times as many FIFOs as the serial I/O using clock synchronization of FIG. 8, it results in a large pattern area and the inefficient use of substrate area.

SUMMARY OF THE INVENTION

Accordingly, it is the object of the invention to obtain a serial I/O device without the problems described above, whereby a small pattern area and the use of both synchronous and asynchronous operations are enabled.

According to the invention, there is provided a network I/O device as shown in FIG. 1, comprised of first-in/first-out register 5 connected to bus 8 and incorporating output data line 6a and input data line 6c; transmission register 3 for transferring data to network N and reception register 4 for receiving data from network N; control data output means (mode register 1) for storing plural control data 1a and 1b; a no. 1 data switching circuit for connecting either data bus 8 or output data line 6a to transmission register 3 upon the input of control data 1 from either of the control data output means; and a no. 2 data switching circuit for connecting either data bus 8 or output data line 6c to reception register 4 upon the input of control data 1b from either of the control data output means.

A network I/O device according to the invention whereby no. 1 and no. 2 data switching circuits 2a and 2b are controlled in accordance with set values 1a and 1b in transfer mode register 1 to select several data flow paths, consisting of: (1) a path through which transmission data are written to FIFO (first-in/first-out register) 5, then transferred from FIFO 5 to transmission register 3 via output data line 6a for the conduction of data exchange, or reception data are stored to FIFO 5 via input data line 6c, then read out from FIFO 5; (2) a path through which transmission data are written to FIFO 5, then transferred to transmission register 3 for the conduction of data exchange, or reception are directly read from reception register 4; and (3) a path through which transmission data are directly to transmission register 3 for the conduction of data exchange, or reception data are transferred to FIFO 5, then read out from FIFO 5.

DESCRIPTION OF THE PREFERRED EMBODIMENT

Figure 1:
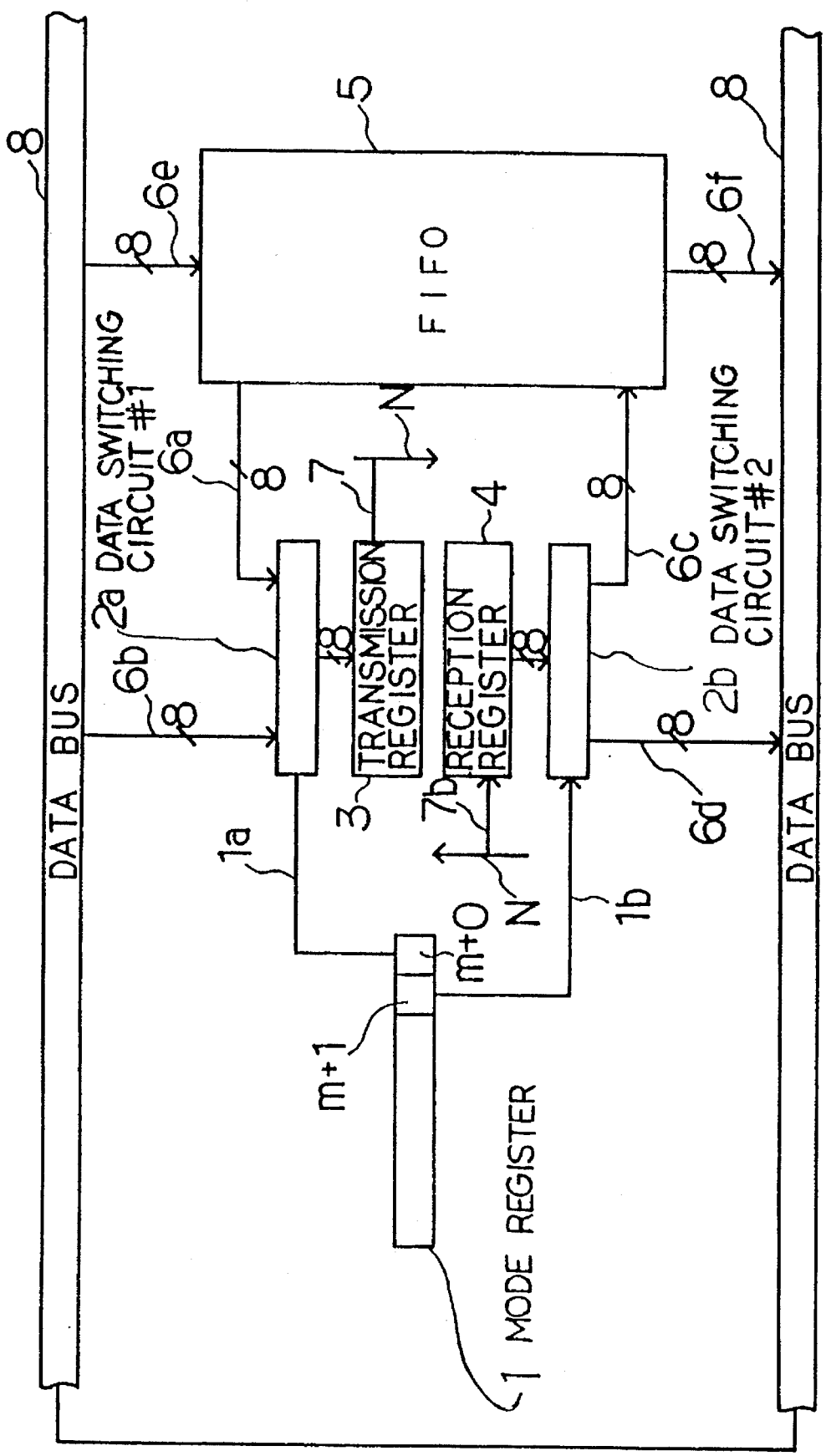
FIG. 1 is a block diagram of a network I/O device according to an embodiment of the invention.

FIG. 1 shows a serial I/O device that performs area exchange of 8-bit data. In the figure, 1 is a mode register that serves as a means for control data output; 1a and 1b are values set in data selection bits m+1 and m+0 of transfer mode register 1; 2a is a no. 1 data switching circuit which connects either data line 6a or data line 6b to transmission register 3; 2b is a no. 2 data switching circuit which connects either data line 6c or data line 6d to reception register 4; and 8 is a data bus. No. 1 data switching circuit 2a is assigned to selection bit m+1 of mode register 1, and no. 2 data switching circuit 2b is assigned to selection bit m+0 of mode register 1, each being controlled respectively by the value (control data) 1a and 1b contained in selection bits m+1 and m+0.

Value a, one of the values set in transfer mode register 1, is input to no. 1 data switching circuit 2a, which selects data line 6a when the set value is "1," or data line 6b when the set value is "0." Value 1b, the other value set in transfer mode register 1, is input to no. 2 data switching circuit 2b, which selects data line 6c when the set value is "1," or data line 6d when the set value is "0." The serial I/O device according to the invention is connected in network N in plural numbers in a clock-synchronized configuration, and begins communication operations immediately when activated.

At this time, setting a value of "1" to both values 1a and 1b results in the connection of data line 6a to transmission register 3 through no. 1 data switching circuit 2a, and the connection of data line 6c to reception register 4 through no. 2 data switching circuit 2b.

When this occurs, transmission data are written to FIFO 5 through data line 6e, and one byte of data is read from FIFO 5, which is transferred to transmission register 3 from data line 6a through no. 1 data switching circuit 2a, and from transmission register 3, the data are set into network N as serial data 7a.

Reception data 7b, on the other hand, is stored in FIFO 5 from data line 6c from reception register 4 through no. 2 data switching circuit 2b. Data read from FIFO 5 are read to bus 8 through data line 6f, and sent to the host computer. In clock-synchronized operations, data are shifted with each byte of data transmitted, making available low address space in the FIFO 5 for the storage of reception data.

Next, we will consider the use of a serial I/O device according to the invention in an asynchronous configuration, connected and operated in plural numbers in network N, which conducts data transmission only or continuous data transmission, and data reception in one byte units. In this case, values 1a and 1b are set to "1" and "0," respectively. This results in the connection of data line 6a to transmission register 3 through no. 1 data switching circuit 2a. Reception register 4, on the other hand, is connected to data line 6d through no. 2 data switching circuit 2b. When this occurs, transmission data are read successively into FIFO 5 through data line 6a, with data read from FIFO 5 in one byte units in order starting with the earliest, and data is transferred to transmission register 3 from data line 6a through no. 1 data switching circuit 2a, then sent into network N from transmission register 3 as serial data 7a. Reception data, on the other hand, are read directly to bus 8 from reception register 4, through no. 1 data switching circuit 2b, then sent to the host computer.

Next, we will consider the use of a serial I/O device according to the invention, also in a asynchronous configuration, which conducts reception only or transmission in one byte units, with reception being continuous. In this case, values 1a and 1b are set to "0" and "1," respectively. This results in the connection of data line 6b to transmission register 3 through no. 1 data switching circuit 2a. Reception register 4, on the other hand, is connected to data line 6c through no. 2 data switching circuit 2b. When this occurs, transmission data are written directly to transmission register 3 from data line 6b through no. 1 data switching circuit 2a, and serial data 7a is sent into network N from transmission register 3. Reception data, on the other hand, are stored successively from reception register 4 to FIFO 5 over data line 6c through no. 2 data switching circuit 2b. Reception data are then read to bus 8 from FIFO 5 in order starting with the earliest, then sent to the host computer.

Figure 2:
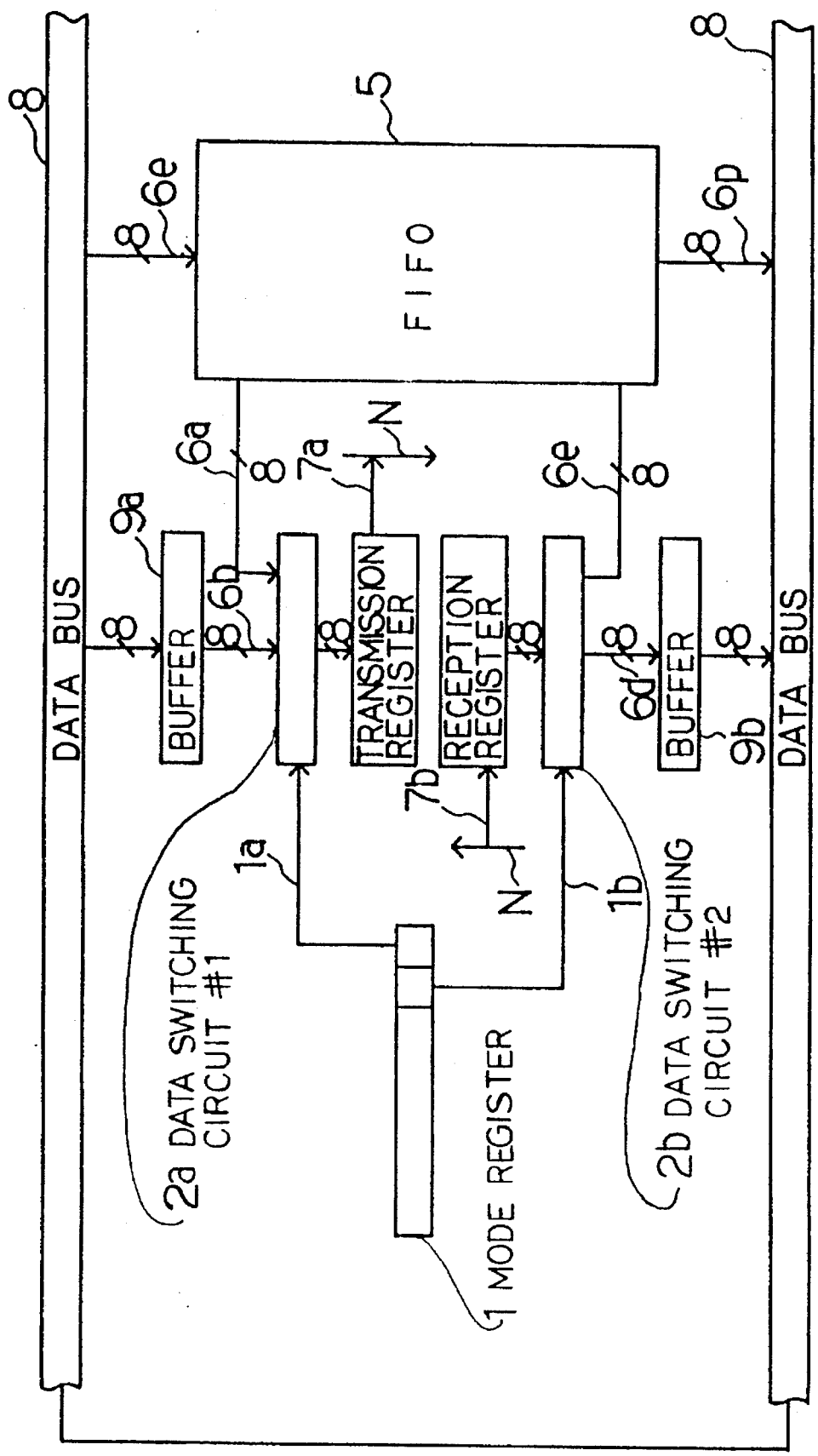
FIG. 2 is a block diagram of a network I/O device according to another embodiment of the invention.
Figure 3:
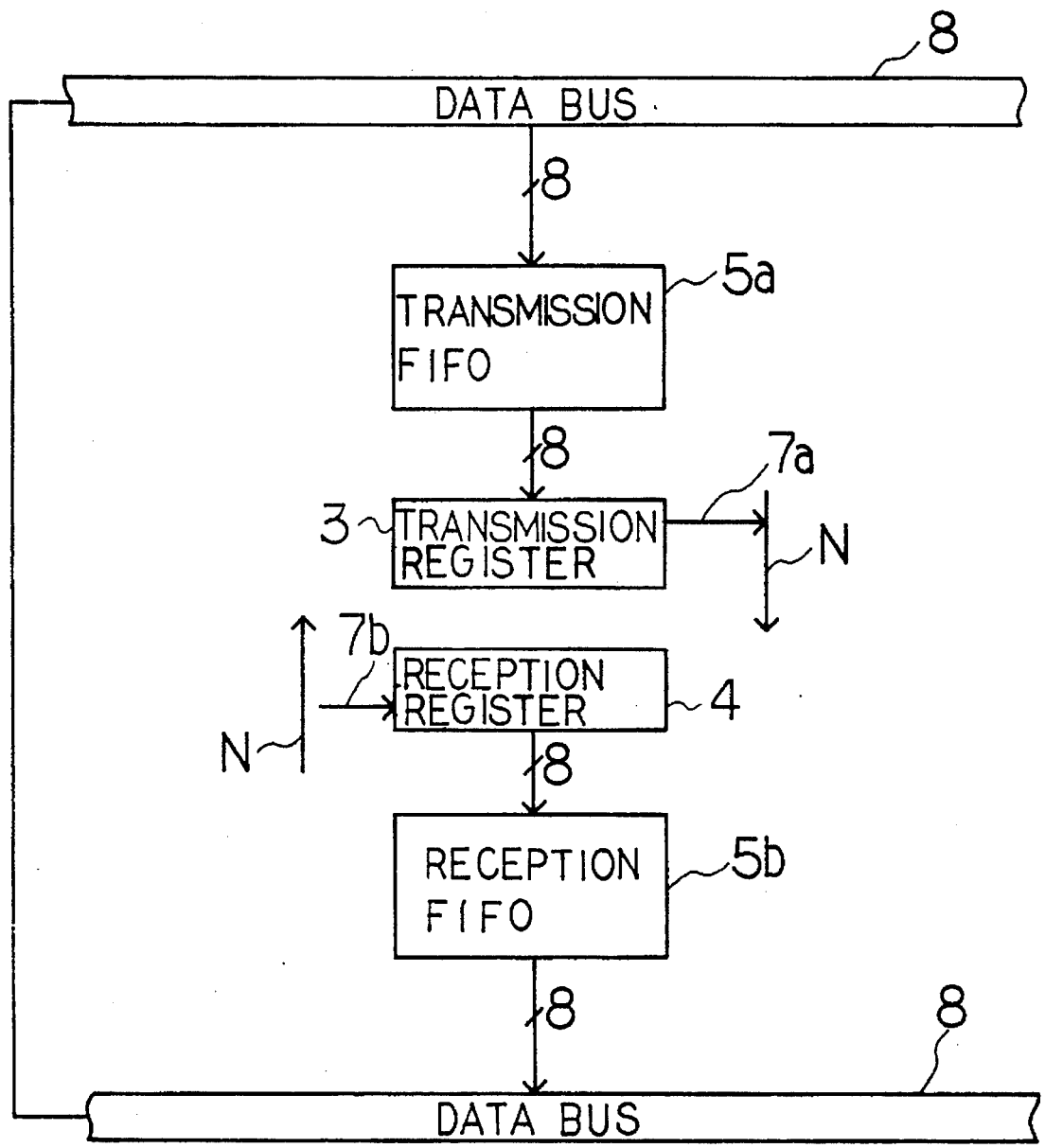
FIG. 3 is a block diagram of a conventional network I/O device.
Figure 4:
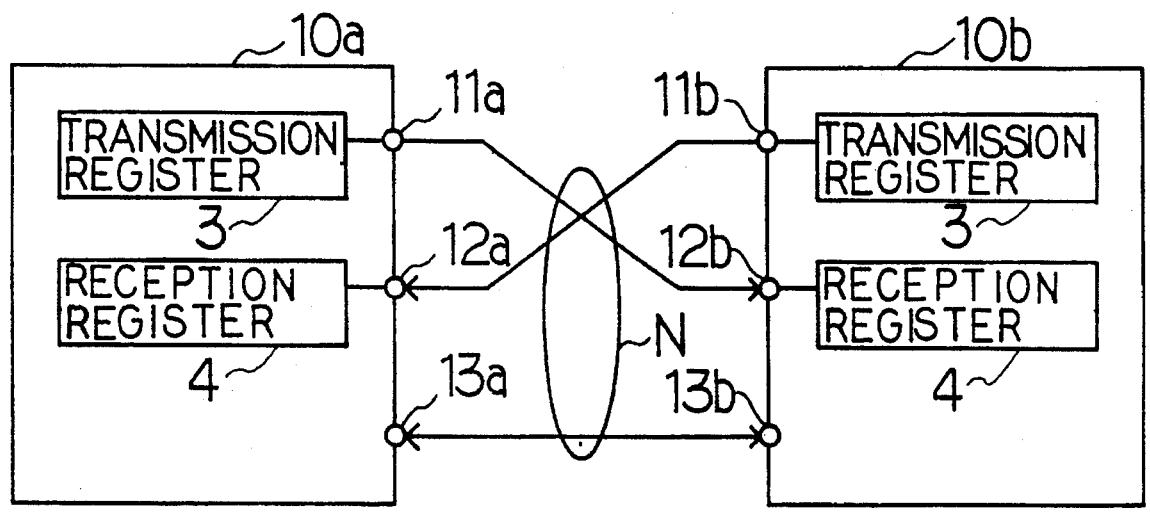
FIG. 4 is a connection diagram for clock-synchronized operations.
Figure 5:
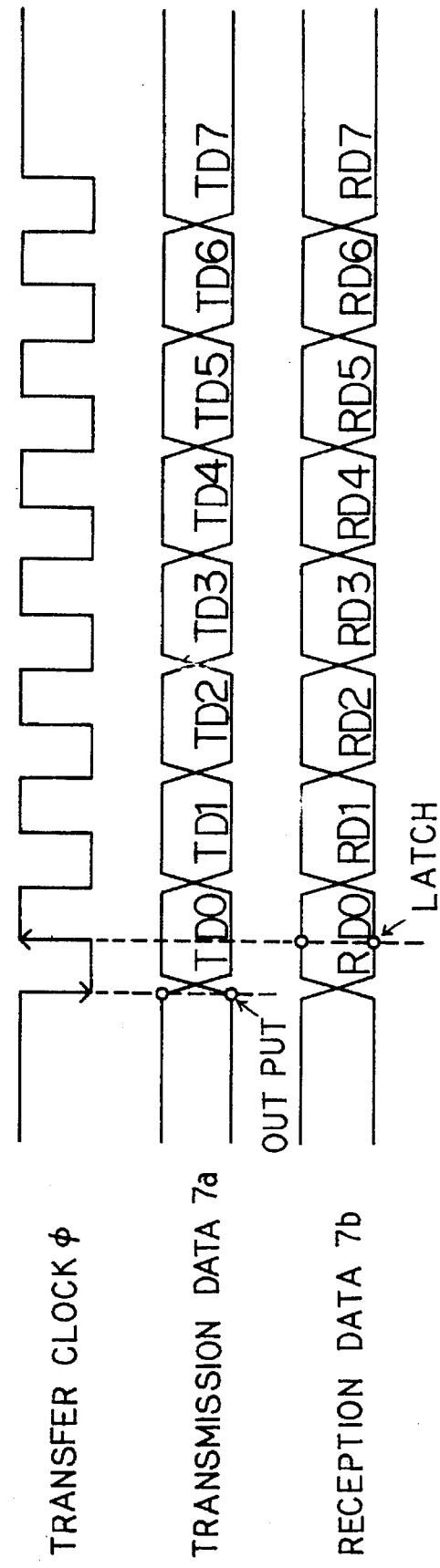
FIG. 5 is an operation diagram of an I/O device in a clock-synchronized configuration.
Figure 6:
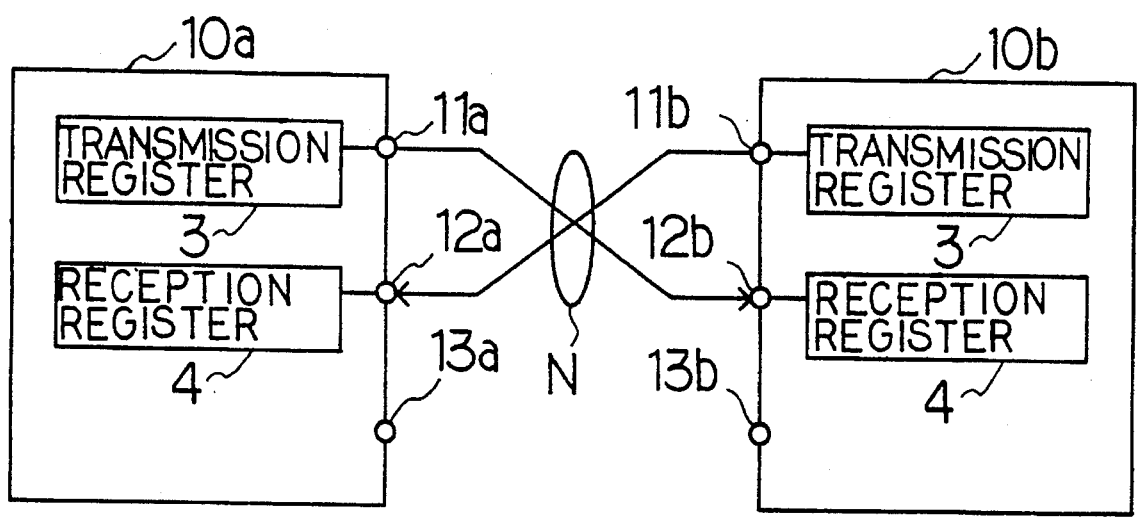
FIG. 6 is a connection diagram for UART (asynchronous) operations.
Figure 7:
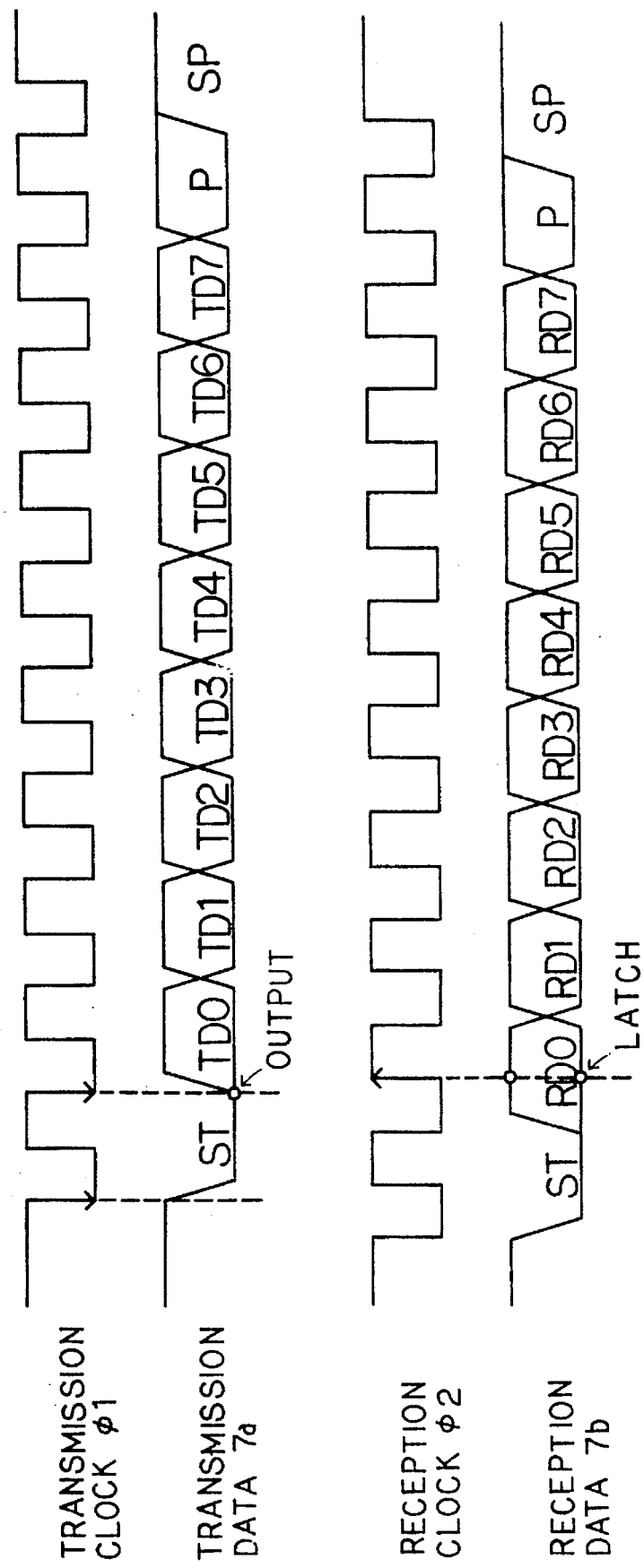
FIG. 7 is an operation diagram for UART (asynchronous) operation.
Figure 8:
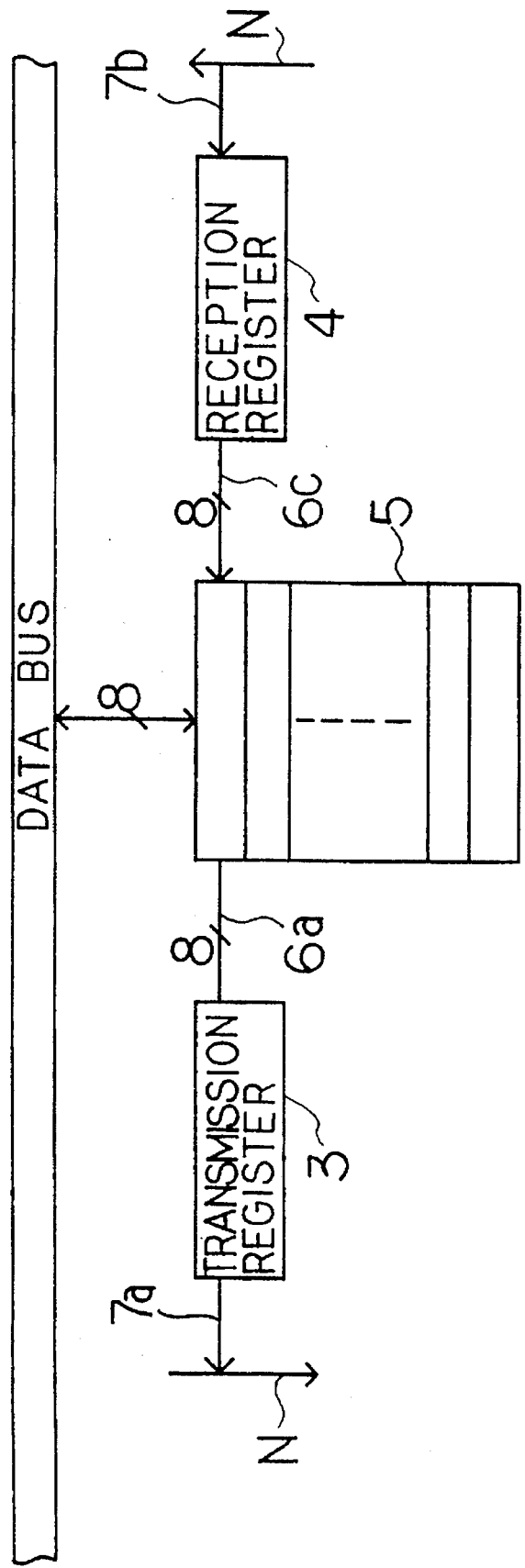
FIG. 8 is a block diagram of a clock-synchronized I/O device only.

In the above embodiment of the invention, an example of direct writing and reading of data to transmission and reception registers has been given in cases where an FIFO is not used. However, a configuration in which one-byte buffers 9a and 9b are respectively incorporated in paths that do not use an FIFO is also possible, as shown in FIG. 2. The use of other means of control data output instead of mode register 1 is also possible.

As explained above, the network I/O device according to the invention is provided with a first-in/first-out register having an output data line and input data line connected to buses, a transmission register for transmitting data to the network and a reception register for receiving data from the network, a mode register for storing plural units of control data, a no. 1 data switching circuit that connects a data bus or data line to the transmission register according to the input of one of the control data units of the mode register; and a no. 2 data switching circuit that connects a data bus or data line to the reception register according to the input of one of the control data units of the mode register. The network I/O device according to the invention uses a single FIFO to allow the use of either a clock-synchronized or a UART (asynchronous) configuration, thus allowing a reduction in pattern area compared with conventional I/O devices.

What is claimed is:

1. A communications network input/output device for selectibly operating in either synchronous or asynchronous modes of operation comprising:

a first-in/first-out register having an output data line and an input data line, said first-in/first-out register connected to a bus;

a transmission register, coupled to said bus and to said output data line, and adapted to output data to the communication network;

a reception register, coupled to said bus and to said data line, and adapted to receive data from the communication network;

a control data output device for outputting control data signals to indicate either the synchronous or asynchronous operating mode of said input/output device;

a first data switching circuit, coupled to said control data output device, for connecting one of said bus or said output data line to said transmission register according to control data signals received from said control data output device; and a second data switching circuit, coupled to said control data output device, for connecting one of said bus or said input data line to said reception register according to said control data signals received form said control data output device.

2. The communications network input/output device of claim 1 wherein the control data output device comprises a mode register whose bits are respectively assigned to said first and said second data switched circuits, and wherein said control data output device stores set values that are written as control data signals to serve as the basis of control of said first and said second data switching circuits.

3. A communications network input/output device selectibly configured for either synchronous or asynchronous modes of operation comprising:

a first-in/first-out (FIFO) register having an output data line and an input data line, said first-in/first-out register connected to a bus;

a transmission register coupled to said bus and to said output data line and adapted to output data to the communication network;

a reception register coupled to said bus and to said data line and adapted to receive data from the communication network;

a control data output device for outputting control data to indicate either the synchronous or asynchronous operating mode of said input/output device;

a first data switching circuit coupled to said control data output device for connecting one of said bus or said output data line to said transmission register according to control data input from said control data output device;

a second data switching circuit, coupled to said control data output device for connecting one of said bus or said input data line to said reception register according to said control data input from said control data output device;

a first buffer disposed between the transmission register and said bus for buffering data output from said transmission register; and a second buffer disposed between the reception register and said bus for buffering data received from said bus.

4. The communications network input/output device of claim 1 wherein said FIFO consists of a single FIFO.

* * * * *